US008908561B2

(12) United States Patent
Krause et al.

(10) Patent No.: US 8,908,561 B2
(45) Date of Patent: Dec. 9, 2014

(54) ENHANCED MOBILE NETWORK SYSTEM ACQUISITION USING SCANNING TRIGGERS

(75) Inventors: Kevin R. Krause, Plymouth, MI (US); Ayaz S. Kassam, Toronto (CA); James Doherty, Wyandotte, MI (US); Ki Hak Yi, Windsor (CA)

(73) Assignee: General Motors LLC, Detroit, MI (US)

( * ) Notice: Subject to any disclaimer, the term of this patent is extended or adjusted under 35 U.S.C. 154(b) by 873 days.

(21) Appl. No.: 12/562,698

(22) Filed: Sep. 18, 2009

(65) Prior Publication Data
US 2011/0069680 A1   Mar. 24, 2011

(51) Int. Cl.
| H04L 12/26 | (2006.01) |
| H04B 7/185 | (2006.01) |
| H04W 4/00 | (2009.01) |
| H04L 12/28 | (2006.01) |
| H04W 48/16 | (2009.01) |
| H04W 88/06 | (2009.01) |
| H04W 36/14 | (2009.01) |

(52) U.S. Cl.
CPC .............. *H04W 48/16* (2013.01); *H04W 88/06* (2013.01); *H04W 36/14* (2013.01)
USPC ........... 370/254; 370/316; 370/331; 370/328; 370/338; 370/252

(58) Field of Classification Search
USPC ......................................................... 370/254
See application file for complete search history.

(56) References Cited

U.S. PATENT DOCUMENTS

| 5,995,832 | A  | * | 11/1999 | Mallinckrodt ................ 455/427 |
| 7,279,989 | B2 | * | 10/2007 | Bettner et al. ................. 331/16 |
| 7,809,369 | B2 | * | 10/2010 | Parmar et al. ................ 455/424 |
| 7,894,795 | B1 | * | 2/2011  | Dunne et al. ................. 455/406 |
| 7,991,381 | B1 | * | 8/2011  | Dunne et al. ............... 455/404.1 |
| 8,068,808 | B2 | * | 11/2011 | Smith ........................ 455/404.2 |
| 8,351,929 | B2 | * | 1/2013  | Izawa et al. ............... 455/435.1 |
| 8,504,095 | B2 | * | 8/2013  | Joo .......................... 455/435.1 |
| 2004/0052230 | A1 | * | 3/2004 | Soliman ...................... 370/335 |
| 2004/0192328 | A1 | * | 9/2004 | Giacalone et al. ............ 455/455 |
| 2004/0219916 | A1 | * | 11/2004 | Kim et al. ................. 455/435.3 |
| 2004/0235475 | A1 | * | 11/2004 | Ishii ........................ 455/435.3 |
| 2005/0003791 | A1 | * | 1/2005 | Bokulic et al. ............... 455/334 |

(Continued)

FOREIGN PATENT DOCUMENTS

| CN | 1725901 A | 1/2006 |
| CN | 1768542 A | 5/2006 |

*Primary Examiner* — Afshawn Towfighi
*Assistant Examiner* — Jenee Williams
(74) *Attorney, Agent, or Firm* — Leydig, Voit & Mayer, Ltd.

(57) ABSTRACT

A system and method for executing network acquisition employ a triggered scan for network acquisition regardless of the recorded optimal nature of the current network. In general, when one or more predefined conditions occur, a network scan is initiated to identify another network, if any, that is more optimal than the current network. Example trigger conditions include failed registration attempts, exceeding a predetermined distance threshold, entry to or exit from a pre-determined region, excess CDMA Chip delay, and others. Triggers may be used singly or in Boolean combinations. In this way, network scanning occurs when it may be beneficial, but will not be initiated too frequently or in situations where connectivity may not actually be suboptimal. This triggered scan provides improved connectivity, and can allow the device to make and receive calls in locations where it would otherwise not have been possible.

15 Claims, 5 Drawing Sheets

(56) References Cited

U.S. PATENT DOCUMENTS

| | | |
|---|---|---|
| 2005/0101244 A1* | 5/2005 | Lipka et al. ............... 455/1 |
| 2005/0265273 A1* | 12/2005 | Karabinis et al. ............ 370/316 |
| 2005/0282489 A1* | 12/2005 | Kamdar et al. ............. 455/3.02 |
| 2006/0111109 A1* | 5/2006 | Kim ............... 455/436 |
| 2007/0142046 A1* | 6/2007 | Welnick ............... 455/434 |
| 2007/0149193 A1* | 6/2007 | Chong ............... 455/435.2 |
| 2007/0281684 A1* | 12/2007 | Parmar et al. ............. 455/432.1 |
| 2008/0045234 A1* | 2/2008 | Reed ............... 455/456.1 |
| 2009/0005083 A1* | 1/2009 | Hoshino et al. ............ 455/456.5 |
| 2009/0052395 A1* | 2/2009 | Bao et al. ............... 370/331 |
| 2009/0219893 A1* | 9/2009 | Korpela et al. ............. 370/332 |
| 2009/0264094 A1* | 10/2009 | Smith ............... 455/404.2 |
| 2010/0085935 A1* | 4/2010 | Chin ............... 370/331 |
| 2010/0173628 A1* | 7/2010 | Hosain et al. ............. 455/435.2 |
| 2010/0214989 A1* | 8/2010 | Pippert et al. ............. 370/328 |

* cited by examiner

| 400a | TRIGGER 1 | TRIGGER 2 | TRIGGER 3 | SCAN |
|---|---|---|---|---|
| | 0 | 0 | 0 | NO |
| | 1 | 0 | 0 | YES |
| | 0 | 1 | 0 | YES |
| | 1 | 1 | 0 | YES |
| | 0 | 0 | 1 | YES |
| | 1 | 0 | 1 | YES |
| | 0 | 1 | 1 | YES |
| | 1 | 1 | 1 | YES |

| 400b | TRIGGER 1 | TRIGGER 2 | TRIGGER 3 | SCAN |
|---|---|---|---|---|
| | 0 | 0 | 0 | NO |
| | 1 | 0 | 0 | NO |
| | 0 | 1 | 0 | NO |
| | 1 | 1 | 0 | YES |
| | 0 | 0 | 1 | NO |
| | 1 | 0 | 1 | NO |
| | 0 | 1 | 1 | YES |
| | 1 | 1 | 1 | YES |

| 400c | TRIGGER 1 | TRIGGER 2 | TRIGGER 3 | SCAN |
|---|---|---|---|---|
| | 0 | 0 | 0 | NO |
| | 1 | 0 | 0 | NO |
| | 0 | 1 | 0 | NO |
| | 1 | 1 | 0 | NO |
| | 0 | 0 | 1 | NO |
| | 1 | 0 | 1 | NO |
| | 0 | 1 | 1 | NO |
| | 1 | 1 | 1 | YES |

FIG. 4

| | Distance $BS > D_p$ | Chip delay $>100$ μsec. | No local XM repeaters? | SCAN | |
|---|---|---|---|---|---|
| 500 | 0 | 0 | 0 | NO | 503 |
| | 1 | 0 | 0 | NO | 505 |
| | 0 | 1 | 0 | NO | 507 |
| 501 | *1* | *1* | *0* | *YES* | |
| | 0 | 0 | 1 | NO | 509 |
| | 1 | 0 | 1 | NO | 511 |
| | 0 | 1 | 1 | NO | 513 |
| | 1 | 1 | 1 | NO | 515 |

FIG. 5

ENHANCED MOBILE NETWORK SYSTEM ACQUISITION USING SCANNING TRIGGERS

BACKGROUND OF THE INVENTION

The prevalence of cellular or other wirelessly networked communication devices has created entirely new ways of living and doing business, as individuals and businesses alike extend their activities using this burgeoning technology. However, the capabilities of such devices are limited by the capabilities of the associated wireless network used to facilitate communications. For example, a cellular communications device may be capable of adequate communications performance, but the associated network may limit the quality of communications to something much less based on current network conditions. As users move and change from network to network or cell to cell, the network capabilities and user experience may change. In the inventors' view, it is desirable to maximize the user experience by optimizing network usage.

Currently, mobile devices often idle on suboptimal networks due to the effects of system dragging and lower priority systems within a defined roaming list. As a result, performance is often degraded, even to the point that the device cannot make or receive calls on the current system. Although there may be a more optimal system available, the device in question will not acquire the more optimal system if it is determined that the current system is sufficient. For example, the current system may exhibit a strong forward-link and may actually be a higher priority system than the other system in question, precluding the device from acquiring the new system. This problem is especially acute in situations where the mobile device uses a high gain antenna, such as in a vehicle having a roof-mounted installation.

BRIEF SUMMARY OF THE INVENTION

The invention provides an improved system, method, and mechanism for executing network acquisition via a carefully triggered scan for more optimal networks using one or more predefined triggers. Examples of suitable trigger conditions include (1) a failed registration attempt, i.e., no response from the base station (BS) on the forward-link, (2) exceeding a predetermined distance threshold (e.g. 15 km) from the BS or last Acquisition Task, and (3) entry to or exit from a predetermined region (e.g., 20 km square regions). Other triggers include (1) excess CDMA Chip delay, i.e., delay greater than a pre-determined amount (e.g. 100 μs), and (2) specific combinations of RSSI vs. Ec/Io values, optionally including a time condition (e.g. RSSI<−100 dbm and Ec/Io>7 for at least 60 seconds). Finally, other trigger types may additionally or alternatively be used. For example, satellite radio signal availability may be used as a trigger, such that if no repeaters are available in a given area, the mobile device determines that it is in a rural area and alters or eliminates trigger points appropriately.

The described techniques and structures ensure that network scanning occurs when it may be beneficial, but will not be initiated too frequently or in situations where connectivity may not actually be suboptimal. Thus, the triggered scan feature of the invention provides improved connectivity to the mobile device, and indeed, may allow the device to make and receive calls in locations where, prior to the invention, it would not have been able to, while minimizing the use of resources needed to provide this improved connectivity. Although certain of the examples pertain to telematics units, it will be appreciated that the described principles apply equally to handheld mobile devices.

Other objects and advantages of the invention will become apparent upon reading the following detailed description and upon reference to the drawings.

BRIEF DESCRIPTION OF THE SEVERAL VIEWS OF THE DRAWINGS

FIG. 4 is a collection of generalized truth tables or fact arrays showing sample conditions under which a network scan in initiated in accordance with various implementations of the invention; and FIG. 5 is a fact array according to a specific exemplary implementation of the disclosed principles.

DETAILED DESCRIPTION OF THE INVENTION

Before explaining the details of the invention and the environment wherein the invention may be used, a brief overview is given to guide the reader. In overview, not intended to limit the claims in any way, the invention provides a system and method for improved network acquisition triggering wherein network scanning is executed even in the absence of a known higher priority network than the current network, if a certain trigger condition, or a certain combination of trigger conditions, is met. The manner in which this is done provides improved connectivity to the mobile device, and may allow the device to make and receive calls in locations where it would otherwise not have been able to, while minimizing the use of resources needed to provide this improved connectivity.

Figure 1:
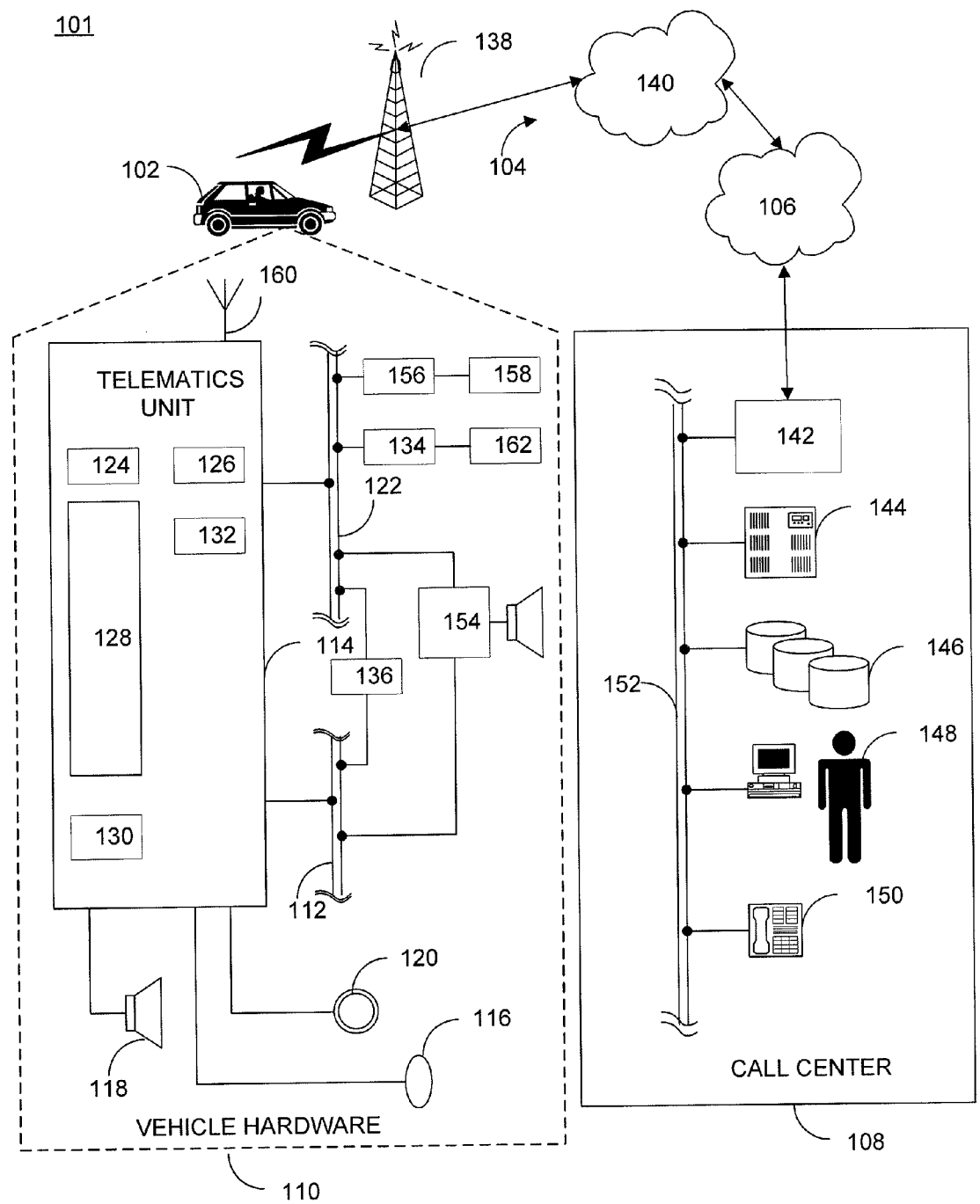
FIG. 1 is a schematic diagram of an operating environment for a mobile vehicle communication system.

An exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, mobile devices such as the telematics unit 114 often idle on suboptimal networks, negatively impacting the user experience when the device is brought into active use. This is effect is due to system dragging and the predefined prioritization of systems within a roaming list, e.g., a PRL. As a result, performance may even be degraded to the point that the device can no longer make or receive calls on the current system.

In many cases, however, there is a more optimal network system available that is not being utilized by the device 114. In particular, the device 114 may be unable to acquire the more optimal system if it has determined that the current system is sufficient, as judged, for example, by a strong forward-link and/or system priority level. This would effectively preclude such a device from acquiring the new system prior to the instant invention. This problem is especially acute in situations where the mobile device uses a high gain antenna, such as in a vehicle having a roof-mounted installation, and as such this is particularly problematic for vehicle-borne telematics units, although the principles of the invention apply equally to other device types as well.

The invention provides improved network acquisition via, among other aspects, a carefully triggered scan for more optimal networks using one or more predefined trigger conditions. Examples of suitable trigger conditions include (1) a failed registration attempt, i.e., no response from the base station (BS) on the forward-link, (2) exceeding a predetermined distance threshold (e.g. 15 km) from the BS or last Acquisition Task, and (3) entry to or exit from a pre-determined region (e.g., 20 km squares).

Other triggers include (1) excess CDMA Chip delay, i.e., delay greater than a pre-determined amount (e.g. 100 μs), and (2) specific combinations of RSSI vs. Ec/Io values, optionally including a time condition (e.g., RSSI<−100 dbm and Ec/Io>7 for at least 60 seconds). Finally, other trigger types may additionally or alternatively be used. For example, satellite radio signal availability may be used as a trigger, such that if no repeaters are available in a given area, the mobile device determines that it is in a rural area and alters or ignores trigger conditions appropriately. In an alternative or complementary implementation, the availability short-range wireless (e.g., 802.11 and Bluetooth) are additionally or alternatively utilized as triggers.

It may be desirable to avoid reliance on any single trigger, although it is certainly possible to use a single trigger in keeping with the principles of the invention set forth herein. In an example of the use of multiple triggers to initiate the acquisition/scanning activity, the device 114 monitors both chip delay and distance, and if it determines that the distance from the BS exceeds some amount, e.g., 15 km and chip delay exceeds a certain threshold, e.g., 100, then the device triggers a scan for a more optimal network. This ensures that scanning will not be initiated too frequently or in situations where connectivity may not actually be suboptimal. Thus, the triggered scan feature of the invention provides improved connectivity to the mobile device to allow the device to make and receive calls if possible in locations where, prior to the invention, it would not have been able to, while minimizing the use of resources needed to provide this improved connectivity.

Figure 2:
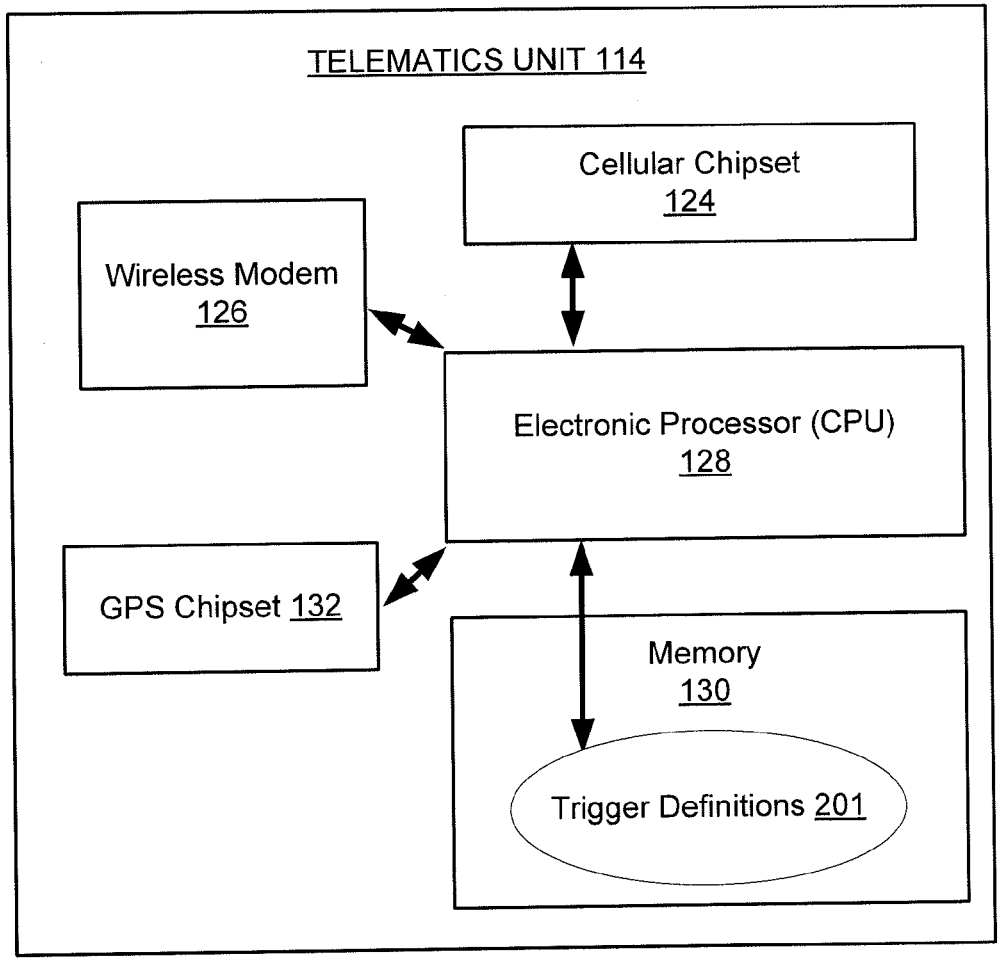
FIG. 2 is a more detailed schematic view of a telematics unit via which the invention may be implemented.

Having considered the overview and environmental material presented above, the reader's attention is now directed to FIG. 2 for a more detailed consideration of certain aspects of the invention. FIG. 2 presents a more comprehensive schematic diagram of the telematics unit 114 usable within one implementation of the invention to provide improved device connectivity. As noted above, the telematics unit 114 is an onboard device that provides a variety of services including communications with the call center 108, and generally includes a cellular chipset/component 124, a wireless modem 126, an electronic processing device 128, electronic memory 130, and a navigation unit containing a GPS chipset/component 132.

It will be appreciated that the electronic processing device 128 is a computing device, e.g., a microprocessor/CPU in an implementation, which operates by reading computer-executable instructions, e.g., program code as well as potentially parameters and data, from a computer-readable medium such as memory 130, which may be RAM, ROM, volatile, nonvolatile, flash, or other memory type. The instructions that are read by the processor 128 are then executed by the processor 128 to generate the desired outcome. Often the desired outcome involves the control of, or reading from, ancillary components such as those shown in FIG. 2, as well as interacting with user interface elements. It will be appreciated that in addition to the memory 130, the processer 128 may have its own dedicated memory within it for rapid access memory tasks and scratch-boarding purposes.

In general, with respect to the instant invention, the memory 130 stores a set of criteria or "triggers" that define circumstances under which a network acquisition scan is to be undertaken. The memory 130 may also store parameters and/or instructions for executing that scan when needed. The triggers may be user-set or user-adjustable, but in an implementation, they are factory-preset, dealer-set values, or values set by call center 108. The processor 128 controls the RF components of the system to perform the scan and to facilitate any needed network acquisition tasks. The roles of the various system components will be discussed further by way of reference when discussing the inventive process, illustrated in flow chart form in FIG. 3.

Figure 3:
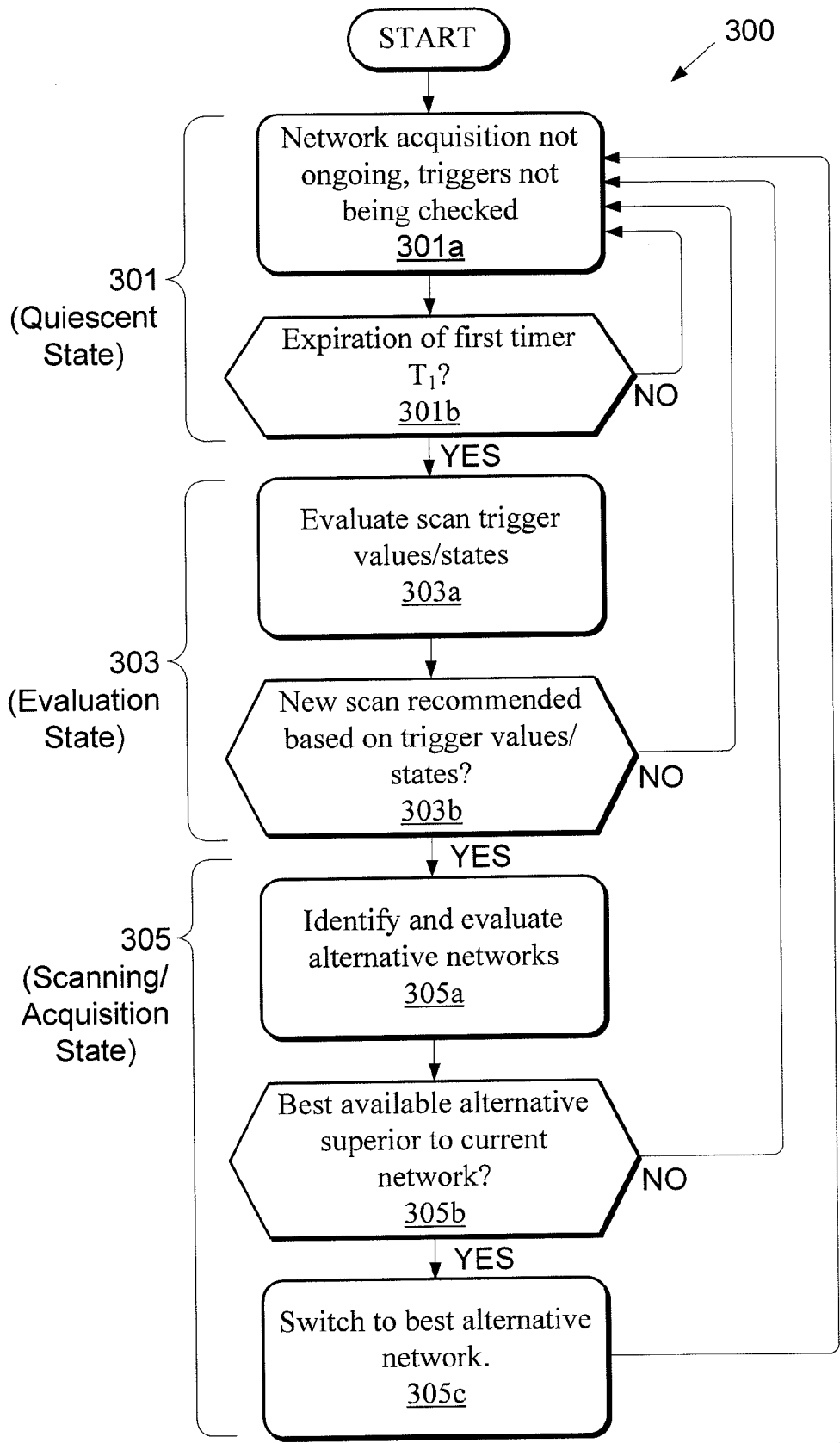
FIG. 3 is a flow chart of an exemplary process for executing a triggered scan in keeping with the invention.

As shown in FIG. 3, a three-state process 300 according to an exemplary implementation of the invention includes a first state 301, a second state 303, and a third state 305. The first state 301 is a quiescent stage in which network acquisition is not ongoing, nor are triggers being checked. During the quiescent state 301, the processor 128 waits, e.g., for the expiration of a first timer $T_1$. In particular, at stage 301a, the processor 128 performs any routine tasks required of it, and does not attempt network acquisition or modification, and does not monitor triggers that would cause a rescan. At the same time, the processor 128 runs the first timer in a parallel stage 301b, and determines whether the timer has expired. During this state 301, the processor 128 is executing all other tasks assigned to it, e.g., receiving user input, facilitating the making and receipt of calls and other communications, executing navigation functions as needed, etc. It will be appreciated that in this and other stages or states, tasks may be executed by the processor 128 in a serial or time-multiplexed manner, depending upon design preference.

If the timer $T_1$ has not expired, the processor 128 continues to operate in the quiescent state 301. Otherwise, if the timer $T_1$ has expired, the process 300 moves to the evaluation state 303, wherein the processor 128 evaluates one or more triggers at stage 303a to determine whether a new scan is justified. As noted above, there are a number of circumstances under which a scan is not ordinarily made but for which a scan would be beneficial in accordance with the principles of the instant invention.

If it is determined at stage 303b that a new scan is not justified on the basis of the evaluated triggers, then the process 300 returns to stage 301a. If instead it is determined at stage 303b that a new scan is justified on the basis of the evaluated triggers, then the process 300 moves to the scanning/acquisition state 305.

At stage 305a of the scanning/acquisition state 305, the processor 128 performs a network scan to identify and evaluate alternative networks available to the telematics unit 114. If no alternative network is available, or if the best available alternative is inferior to the current network, as determined at stage 305b, then the process 300 returns to stage 301a. Otherwise, if it is determined at stage 305b that a best available alternative network is superior to the current network, the process 300 flows to stage 305c, whereupon the device 114 acquires the new network, and the process 300 reverts to stage 301a.

Although the illustrated process 300 utilizes a timer to start the evaluation of triggers, in an alternative implementation, the triggers are continuously monitored or received. For example, anytime there is a failed registration attempt (i.e. no response from the BS on the forward-link), this may initiate a scan or may prompt the review of other triggers.

Thus, it will also be appreciated that each trigger in a given implementation may be sufficient to initiate a scan, or, alternatively, triggers may be recognized in a hierarchical fashion. For example, the criteria for initiating a new network scan may include a first necessary trigger, and a second necessary trigger to be evaluated after occurrence of the first trigger. Alternatively, multiple triggers may be evaluated at the same level.

Having understood the architecture and overall operational flow of the invention, the reader is now directed to FIG. 4, which shows a collection of fact arrays with respect to several different potential implementations. The first table 400a illustrates the logical outcomes for a scan system wherein the occurrence of any one of three triggers is sufficient. Thus, for example, even in rows 401, 403, and 405 where only a single trigger event has occurred, the outcome of the scan determination is "yes," i.e., a scan is to be performed. Moreover, as can be seen from rows 407-415, the occurrence of multiple triggers does not alter the scan determination, but the absence of all triggers will result in a scan decision of "no," i.e., no scan will be performed.

Referring to table 400b, this table illustrates the logical table of outcomes for a scan decision in an implementation wherein the occurrence of at least any two triggers is a sufficient prerequisite for initiating a scan. Thus, in rows 421, 423, and 425, in which at least one trigger condition has occurred, the scan decision is "yes," i.e., a scan will be performed. In contrast, in rows 427-435, wherein one or fewer triggers has occurred, the dictated scan decision is "no," i.e., no scan is to be performed at that time.

Finally, referring to table 400c, this table illustrates a fact array for an implementation wherein the occurrence of all three trigger conditions is a necessary prerequisite to the initiation of a scan. Thus, it can be seen that the outcome of rows 443-455, wherein fewer than three trigger conditions have occurred, is "no," i.e., a scan is not to be performed. However, in row 441, wherein all three trigger conditions have occurred, the scan decision is "yes," i.e., a scan is to be performed.

Although the specific triggers used are not constrained by the invention, it is generally desirable to use triggers whose occurrence indicates a measurable or potentially imminent low level of performance. A non-exhaustive list of example triggers includes: distance from base station (BS) compared to latitude/longitude of latest BS sent in sync message (sys parm); distance passed ($D_a$) since last Acquisition Task, e.g., $D_a$ exceeds pre-determined threshold (e.g. 15 km) using current vehicle latitude/longitude compared to latitude/longitude of last acquisition task performance; exit from pre-determined geo-box(es), e.g., 20 km×20 km regions centered around BS latitude/longitude and subsequent points stored based on the last scan/registration point; CDMA Chip delay greater than a pre-determined amount (e.g. 100); combinations of received signal strength indicator (RSSI) and Ec/Io (CDMA correlated signal strength) values, optionally supplemented with a time component (e.g. RSSI<−100 dbm and Ec/Io>7 for a time period exceeding 60 seconds; and satellite radio signal availability, e.g., employing absence of satellite radio repeaters in a given area to presume rural location and alter trigger points appropriately by relaxing or ignoring one or more triggers.

FIG. 5 illustrates a fact array 500 for a specific combination of predetermined triggers including a distance constraint and a chip delay constraint, coupled with a satellite radio repeater requirement. The interaction of the triggers is such that passage of a predetermined distance and a chip delay that exceeds a predetermined threshold are, taken together, necessary and almost always sufficient conditions. However, regardless of the occurrence of these conditions, if the satellite radio condition shows a lack of repeaters, the scan is delayed, and not performed at that time.

Referring more specifically to the illustrated table 500, it can be seen that when the distance and delay conditions are both true and the satellite radio condition is not true, as in row 501, then the scan decision is "yes," i.e., a scan is to be performed. In contrast, if either of the first two conditions is false, as in rows 503-507, or if the satellite radio condition is true, as in rows 509-515, then the dictated scan decision is "no," i.e., no scan is to be performed at that time.

The benefits of the described system will be apparent from the foregoing descriptions and examples. For example, the system provides improved connectivity to the mobile device, to the extent that in some case it will be able to make and receive calls in locations where, without this system, it would not have been able to do so. This will in turn improve Customer Satisfaction Indicators CSI and usage in areas where the system could not previously be used.

While the foregoing examples have been set forth in the context of CDMA systems and technology, it will be appreciated that the invention is not limited to CDMA implementations. For example, the principles of the invention apply equally to GSM (Global System for Mobile Communications).

It will be appreciated that the foregoing methods and implementations for network acquisition are merely examples of the inventive principles, and that these illustrate only preferred techniques. It is contemplated that other implementations of the invention may differ in detail from foregoing examples. All references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing improved network connectivity to a wireless device by identifying an alternative cellular network to replace a current cellular network, the device being associated with a Preferred Roaming List (PRL), the method comprising:
    determining, by the wireless device, while idling on the current cellular network, status of a plurality of preconfigured trigger conditions, wherein combinations of at least two preconfigured trigger conditions define circumstances under which a network acquisition scan is to be undertaken, and wherein a preconfigured trigger condition in each of the combinations is detection of local satellite radio repeaters;
    initiating, in response to detecting at least one of the combinations of preconfigured trigger conditions is met, a scan of one or more alternative networks, the scan including at least one network that is not listed in the PRL, wherein none of the combinations of preconfigured trigger conditions can be met when no local satellite radio repeaters are detected;
    identifying, during the scan, an alternative network that supports a service level that is higher than the current cellular network; and
    disassociating from the current cellular network and acquiring the alternative network.

2. The method according to claim 1, wherein the preconfigured trigger conditions further include at least one of: distance of the wireless device from a base station being greater than a preconfigured threshold, distance of the wireless device from a site of a prior acquisition task being greater than a preconfigured threshold; exiting from a preconfigured geographical region; Code Division Multiple Access (CDMA) chip delay being greater than a preconfigured amount; a received signal strength being less than a threshold value; and Ec/Io being above a preconfigured threshold.

3. The method according to claim 2, wherein the preconfigured amount of CDMA chip delay is 100 µs.

4. The method according to claim 1, wherein the preconfigured trigger conditions further include: distance of the wireless device from a base station being greater than a preconfigured threshold, wherein the distance of the wireless device from the base station is determined by comparing a current latitude/longitude with a base station latitude/longitude included in a sync message.

5. The method according to claim 1, wherein the preconfigured trigger conditions further include: distance of the wireless device from a site of a prior acquisition task being greater than a preconfigured threshold, wherein the distance of the wireless device from the site of the prior acquisition task is determined by recording a latitude/longitude where the prior acquisition task was performed and comparing a current latitude/longitude to the recorded latitude/longitude.

6. The method according to claim 1, wherein the preconfigured trigger conditions further include: received signal strength being less than a preconfigured signal value and Ec/Io being above a preconfigured threshold, and wherein the plurality of combinations includes a combination of preconfigured trigger conditions where:
    for a duration exceeding a threshold duration, the received signal strength is less than a preconfigured signal value and the Ec/Io is above a preconfigured noise value; and
    satellite radio is available.

7. The method according to claim 6, wherein the threshold duration is about 60 seconds and the preconfigured signal value is about −100 dbm.

8. The method according to claim 6, wherein the preconfigured noise value is about 7.

9. The method of claim 1, further comprising placing a wireless call on the alternative network that could not be placed on the current network.

10. The method of claim 1, further comprising receiving a call on the alternative network that could not be received on the current cellular network.

11. The method according to claim 1, wherein the alternative network is not listed in the PRL.

12. The method according to claim 1, wherein the alternative network is listed in the PRL, but is associated with a lower priority in the PRL than the current cellular network.

13. The method according to claim 2, wherein the preconfigured trigger conditions are user-selectable.

14. A non-transitory computer-readable medium having thereon computer-executable instructions for providing improved network connectivity to a wireless device by identifying an alternative cellular network to replace a current cellular network, the device being associated with a Preferred Roaming List (PRL), the computer-executable instructions comprising instructions for:
    determining, while idling on the current cellular network, status of a plurality of preconfigured trigger conditions, wherein combinations of at least two preconfigured trigger conditions define circumstances under which a network acquisition scan is to be undertaken, and wherein a preconfigured trigger condition in each of the combinations is detection of local satellite radio repeaters;
    initiating, in response to detecting at least one of the combinations of preconfigured trigger conditions is met, a scan of one or more alternative networks, the scan including at least one network that is not listed in the PRL, wherein none of the combinations of preconfigured trigger conditions can be met when no local satellite radio repeaters are detected;

identifying an alternative network during the scan that supports a service level that is higher than the current cellular network; and disassociating from the current cellular network and acquiring the alternative network.

15. A vehicle-borne telematics unit for communicating over one or more wireless networks, the telematics unit comprising:

a processor for operating the telematics unit in accordance with computer-readable executable instructions; and a memory associated with the processor and having thereon computer-executable instructions for identifying an alternative cellular network to replace a current cellular network that was selected based on a Preferred Roaming List (PRL), the instructions including instructions for:

determining, while idling on the current cellular network, status of a plurality of preconfigured trigger conditions, wherein combinations of at least two preconfigured trigger conditions define circumstances under which a network acquisition scan is to be undertaken, and wherein a preconfigured trigger condition in each of the combinations is detection of local satellite radio repeaters, initiating, in response to detecting at least one of the plurality of combinations of preconfigured trigger conditions is met, a scan of one or more alternative networks, the scan including at least one network that is not listed in the PRL, wherein none of the combinations of preconfigured trigger conditions can be met when no local satellite radio repeaters are detected, identifying an alternative cellular network that supports a service level higher than the current cellular network, and disassociating from the current cellular network and acquiring the alternative cellular network.

* * * * *